(No Model.) 2 Sheets—Sheet 1.
E. GRAUERT.
BICYCLE TIRE.

No. 518,691. Patented Apr. 24, 1894.

Witnesses
Edwin L. Bradford
Curtis Hammond

E. Grauert  Inventor
By Wm. C. W. Intire
Attorney

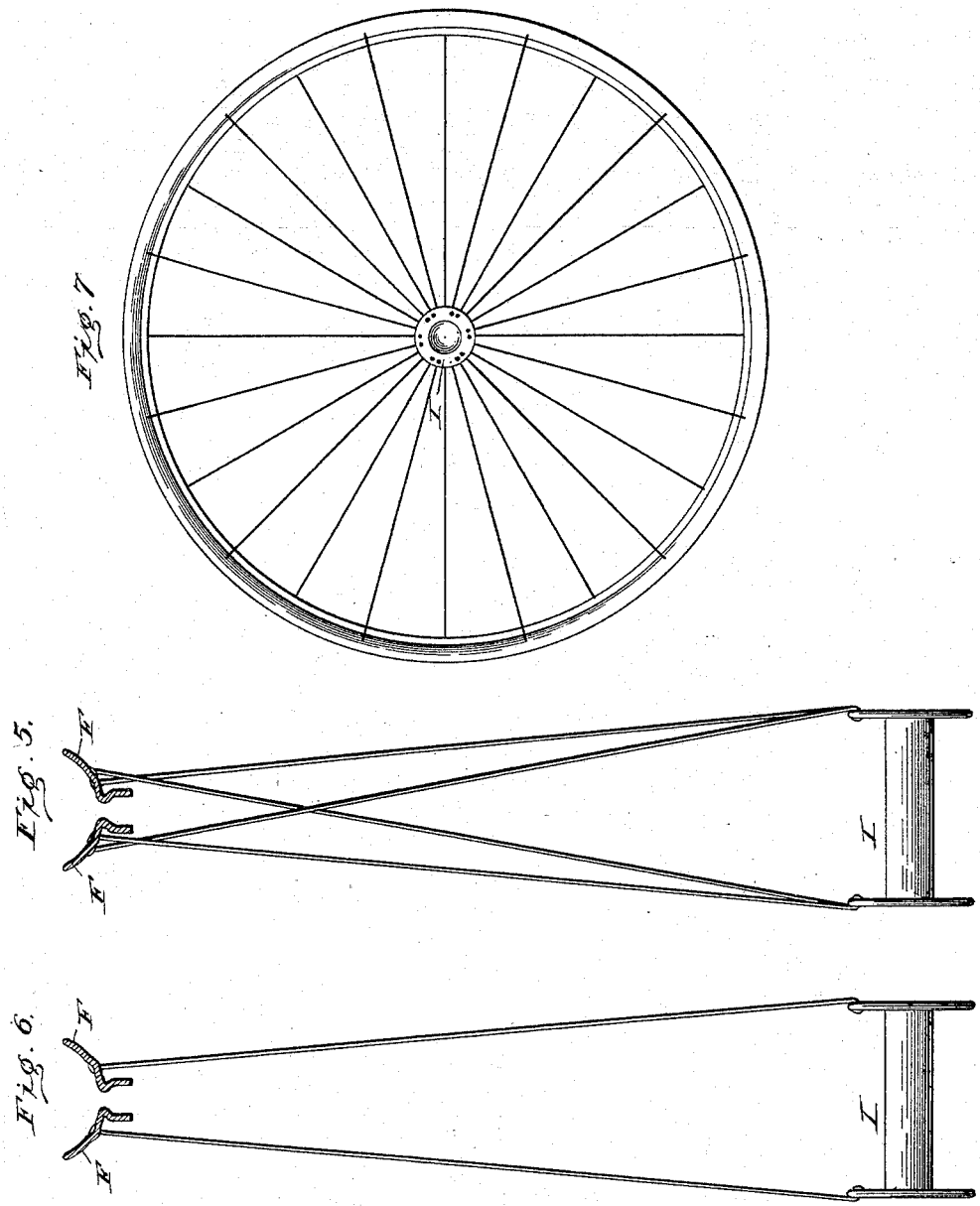

UNITED STATES PATENT OFFICE.

EDGAR GRAUERT, OF NEW YORK, N. Y.

BICYCLE-TIRE.

SPECIFICATION forming part of Letters Patent No. 518,691, dated April 24, 1894.

Application filed March 23, 1893. Serial No. 467,275. (No model.)

*To all whom it may concern:*

Be it known that I, EDGAR GRAUERT, a subject of the Emperor of Germany, residing at New York city, in the county of New York and State of New York, have invented certain new and useful Improvements in Bicycle-Tires; and I do hereby declare the following to be a full, clear, and exact description of the invention, such as will enable others skilled in the art to which it appertains to make and use the same.

My invention relates to certain new and useful improvements in bicycle tires and the means for securing the same in place.

My invention has for its object to provide a pneumatic tire which shall be very durable and effective in use, which can be readily secured in position or partially or entirely removed, which shall be free from the ordinary "creeping" movement on the rim and which will be firmly held in place for use by the peculiar construction and arrangement of the rim and spokes of the wheel. And with these ends and objects in view my invention consists in the details as to material, construction and arrangement hereinafter fully described and specifically claimed.

In order that those skilled in the art may fully understand my invention I will proceed to describe the construction and arrangement of the same, referring by letters to the accompanying drawings, in which—

Figure 1:
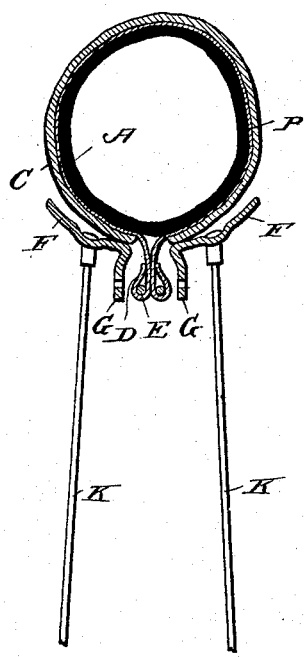
Figure 2:
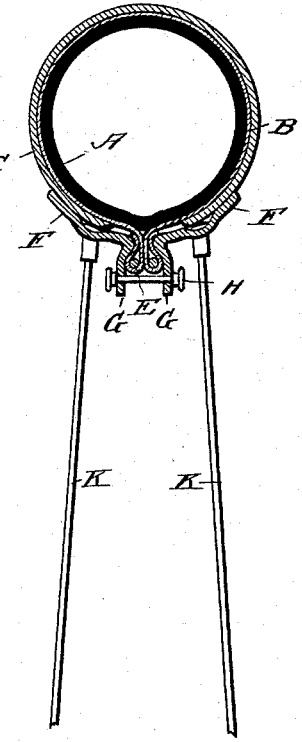
Figure 3:
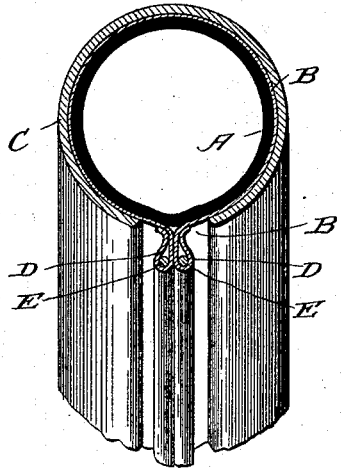
Figure 4:
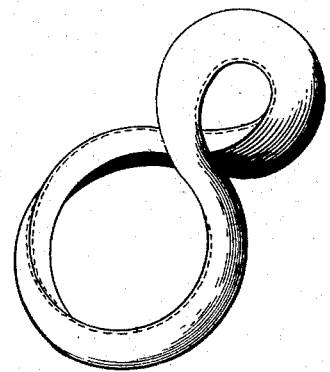

Figure 1 represents a cross section of my improved tire and rim, with the tire only partly inflated, and the rim in its open condition to receive the edges of the covering of the tire. Fig. 2 is a similar view showing the tire completely inflated, and with the edges of the covering rigidly secured in place within the rim of the wheel. Fig. 3 is a detail view partly in section showing a portion of a tire disconnected from the rim of the wheel. Fig. 4 is a plan view of a complete tire, and showing the action of the elastic cords or spiral springs concealed within the edges of the outer covering, as will be presently explained. Fig. 5 is a plan of the rim, hub and spokes of a wheel, adapted to co-operate with the tire, the rim being shown in cross section. Fig. 6 is a similar view showing a modification of the arrangement of the spokes. Fig. 7 is a side elevation of a wheel and tire embodying my improvements.

Similar letters denote like parts in the several figures.

A represents an inner inflatable tube composed of rubber, which is inclosed and confined in place by an outer covering composed of two layers,—the inner one B is made of canvas or any other suitable non-stretchable flexible material and an outer layer C preferably of leather (although rubber may be used). The two layers B, C, are cemented or otherwise suitably joined together, and the edges of the inner layer B are returned upon themselves and cemented or stitched together to form pockets D for the reception of elastic cords or spiral springs E which are of a length considerably less than that of the canvas strip B, so that the composite covering B—C when removed from the tire of the wheel will be drawn into condition substantially as shown at Fig. 4. The outer covering C is narrower than the inner canvas strip B in order that the pocket edges of the same may be readily inserted through the split rim of the wheel as clearly shown at Figs. 1 and 2, while the outer layer C will seat itself properly upon the exterior curved face of the rim.

The rim employed to secure the tire in place is composed of two sections F, F, the inner edges of which are turned downwardly or inwardly to form circumferential ribs or flanges G, G, these ribs or flanges are drawn toward each other and secured in the proper relation by suitable bolts or screws H, arranged at any desired number of localities, or, in lieu of the screw bolts, any other suitable clamping devices may be employed. From this construction it will be seen that the pocket edges of the canvas strip or tube B are confined between the flanges G G, of the two sections of the rim in the manner shown clearly at Fig. 2, so that it cannot escape without first loosening the bolts H. After the tubular canvas B with the interior inflatable rubber tube A and outer or tread surface C of leather has been secured in position by binding the edges of the canvas B between the flanges of the sectional rim, the interior rubber tube A is completely inflated, and the composite covering B—C is necessarily and correspondingly distended so that a complete and perfect seat is established upon the outer curved surface of the rim, and as the edges of the canvas B are confined throughout their entire extent, it will be seen that no creeping action can possibly take place; and this is a great desideratum in pneumatic tires. The two sections F F of the rim are connected with the hub I of the wheel by spokes K, the outer ends of which are seated by nipples or otherwise in suitable depressions in the rim sections F, so as to avoid the abrasion of the tire. These spokes may be straight, or tangent spokes, but in order to secure the best results, whether they be straight or tangent, I arrange them so that each alternate spoke leads from the hub to the rim section on the opposite side as shown at Figs. 5 and 7, and by this arrangement I secure great resistance against lateral pressure, and as will be seen each rim side is alternately connected by both hoop circles, whereby the anchorage forms angles which are situated more favorably than in any other form of construction of which I am aware. And in this connection it will be understood that while I have designed this construction and arrangement with special reference to useful effects in securing my improved tire in position in the two-part or sectional rim, the angles formed by anchorage of the spokes arranged as described, may be very desirable in wheels of other kinds and consequently I do not wish to be limited in this feature of invention by its use with a particular kind of tire.

When it is desired to place the tire in position upon the rim, the screw bolts or eqiuvalent devices applied to the flanges G, G, are loosened and the slit or opening between the two sections F F of the rim is enlarged sufficiently to admit of the passage of the two pocket edges of the canvas strip or tube B to pass the throat of said slit or opening, and as the tendency and action of the elastic bands, cords or spiral springs E is to contract the inner circumference of the tire, it will tend to draw the pocket edges of the tire into and through the throat of the opening between the rim sections and thus facilitate the proper placement of the tire, and when this has been accomplished the screw bolts H or their equivalents are tightened to rigidly clamp the tire in position.

From the construction and arrangement shown and described it will be understood that the tire can be most expeditiously put in place, or removed, there being no metal parts in the tire, it is of necessity lighter, and the wear and tear is equalized in all parts. The rim is firm and solid, and at the same time light, and the creeping of the tire on the rim is absolutely avoided. Another advantage exists in the fact that the tire can be partially removed as required for the purpose of repairing the inner inflatable tube, without taking the wheel out of the frame.

Each and all of the details of construction are either desirable or necessary to carry out my invention, but I wish it to be distinctly understood that some of the features of invention may be advantageously used in wheels of different construction so far as the tire is concerned—for instance it may be desirable to make a rim split centrally and drawn together by clamping bolts, and it may be desirable to arrange the spokes as hereinbefore described, that is each alternate spoke bridging or tying one side of the hub to the opposite side of the rim, in contradistinction to the present mode of arranging the outer ends of the spokes all in the same plane with reference to the rim.

The outer surface of my improved tire, as before stated, is composed of leather, which gives a comfortable tread to the wheel, and at the same time avoids slipping; and I prefer to impregnate said leather covering with any suitable waterproof compound which will render the leather pliable and at the same time protect the inner tubes from moisture, &c.

What I claim as new, and desire to secure by Letters Patent, is—

1. A bicycle tire composed of a continuous air tight tube, an outer tread surface of leather or rubber, and an intermediate strip or layer of flexible non-stretchable material, the edges of which are formed into pockets provided with elastic cords or bands located therein, substantially as and for the purposes set forth.

2. In a pneumatic tire a strip of flexible, non-stretchable material provided with two pockets, each inclosing elastic cords, for the purpose of holding such a tire in position when inflated.

In testimony whereof I affix my signature in presence of two witnesses.

EDGAR GRAUERT.

Witnesses:
M. H. HULBERT,
DANL. LU TOWER.